United States Patent
Chen et al.

(10) Patent No.: US 11,754,586 B2
(45) Date of Patent: Sep. 12, 2023

(54) WIND SPEED DETECTION SYSTEM AND WIND SPEED DETECTION METHOD

(71) Applicant: Coretronic Intelligent Robotics Corporation, Hsin-Chu (TW)

(72) Inventors: Ying-Chieh Chen, Hsin-Chu (TW); Tai-Yuan Wang, Hsin-Chu (TW); I-Ta Yang, Hsin-Chu (TW)

(73) Assignee: Coretronic Intelligent Robotics Corporation, Hsin-Chu (TW)

( * ) Notice: Subject to any disclaimer, the term of this patent is extended or adjusted under 35 U.S.C. 154(b) by 0 days.

(21) Appl. No.: 17/741,466

(22) Filed: May 11, 2022

(65) Prior Publication Data

US 2022/0365108 A1 Nov. 17, 2022

(30) Foreign Application Priority Data

May 12, 2021 (CN) .......................... 202110516219.7

(51) Int. Cl.
*G01P 5/165* (2006.01)
*G01P 21/00* (2006.01)

(52) U.S. Cl.
CPC .............. *G01P 5/165* (2013.01); *G01P 21/00* (2013.01)

(58) Field of Classification Search
CPC ...................................................... G01P 5/165
See application file for complete search history.

(56) References Cited

FOREIGN PATENT DOCUMENTS

| | | |
|---|---|---|
| CN | 203337182 | 12/2013 |
| CN | 104316718 | 1/2015 |
| CN | 107076775 | 8/2017 |
| CN | 110244753 | 9/2019 |
| CN | 110427047 | 11/2019 |
| CN | 110537215 | 12/2019 |
| JP | 2012242087 A | * 12/2012 |
| TW | 201111787 | 4/2011 |

OTHER PUBLICATIONS

"Notice of allowance of Taiwan Counterpart Application", dated Aug. 5, 2022, p. 1-p. 5.

* cited by examiner

*Primary Examiner* — Walter L Lindsay, Jr.
*Assistant Examiner* — Andrew V Do
(74) *Attorney, Agent, or Firm* — JCIPRNET

(57) ABSTRACT

A wind speed detection system and a wind speed detection method are provided. The wind speed detection system includes a pipe body and a controller. The pipe body comprises a pressure sensing module and a suction pump. The pressure sensing module is connected to a first opening through a first pipe and connected to a second opening through a second pipe. The first pipe has a main pipe. Two ends of a first alternative pipe are connected to two ends of the main pipe. When the controller performs a self-checking operation, the main pipe is closed and the first alternative pipe is opened. The controller starts the suction pump to perform forward suction. The controller measures a first air pressure through the first pipe and measures a second air pressure through the second pipe by the pressure sensing module. The controller calculates a reference wind speed value according to the first and second air pressures.

20 Claims, 6 Drawing Sheets

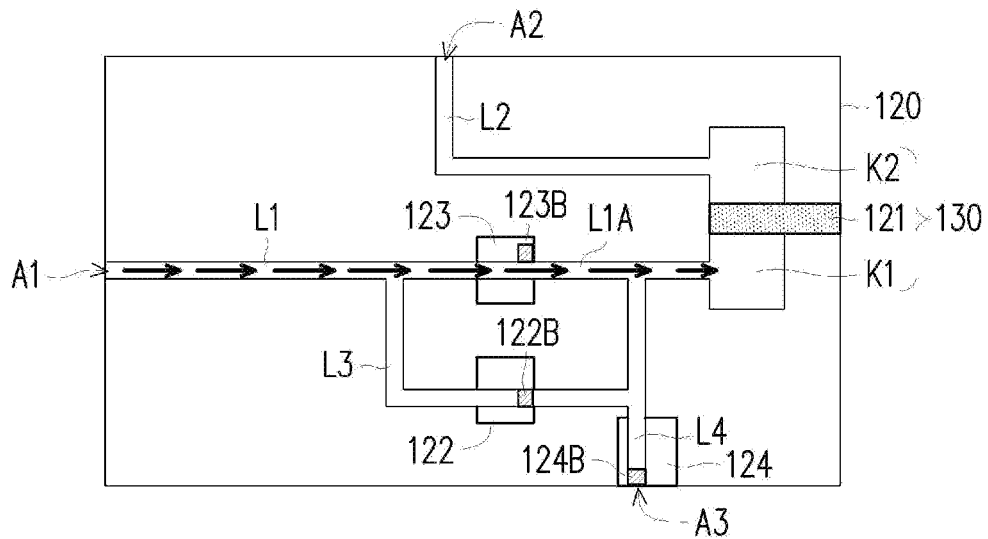

FIG. 5

```
┌─────────────────────────────────────────────────┐
│ When the wind speed detection system performs a │
│ normality check operation, opening the main pipe and │── S610
│ closing the first alternative pipe              │
└─────────────────────────────────────────────────┘
                        ↓
┌─────────────────────────────────────────────────┐
│ Measuring another first air pressure through the first pipe │
│ and measuring another second air pressure through the │── S620
│ second pipe by the pressure sensing module      │
└─────────────────────────────────────────────────┘
                        ↓
┌─────────────────────────────────────────────────┐
│ Calculating a wind speed value according to the another │── S630
│ first air pressure and the another second air pressure │
└─────────────────────────────────────────────────┘
```

FIG. 6

WIND SPEED DETECTION SYSTEM AND WIND SPEED DETECTION METHOD

CROSS-REFERENCE TO RELATED APPLICATION

This application claims the priority benefit of China application serial no. 202110516219.7, filed on May 12, 2021. The entirety of the above-mentioned patent application is hereby incorporated by reference herein and made a part of this specification.

BACKGROUND

Technical Field

The disclosure relates to a detection technique, and particularly relates to a wind speed detection system and a wind speed detection method.

Description of Related Art

In flight speed detection of an unmanned aerial vehicle, a general Pitot tube device may be used to detect a wind speed, and then the wind speed value is converted to a flight speed of the unmanned aerial vehicle, so as to prevent an overspeed or stall resulting from improper operations of the unmanned aerial vehicle. In this regard, based on the conventional design of the Pitot tube device, in the flight speed detection of a general unmanned aerial vehicle, it may not automatically determine whether the detection system is normal or whether a pipe is blocked. Therefore, in the existing unmanned aerial vehicles, a Pitot tube device abnormality or a pipe blockage may be detected only after taking off, which may lead to an abnormal value of the flight speed detection result or even lead to an aircraft accident. In addition, the conventional Pitot tube device does not have a function of automatically removing obstructions. In view of the above points, solutions of several embodiments will be provided below.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a wind speed detection system and a wind speed detection method adapted for an unmanned aerial vehicle, which may automatically determine whether the system is normal or whether a pipe is blocked.

Other objectives and advantages of the disclosure may be further understood from the technical features disclosed herein.

To achieve one, part, or all of the above objectives or other objectives, an embodiment of the disclosure provides a wind speed detection system adapted for an unmanned aerial vehicle. The wind speed detection system includes a pipe body and a controller. The pipe body has a first opening, a second opening, a pressure sensing module and a suction pump. The pressure sensing module is connected to the first opening through a first pipe and is connected to the second opening through a second pipe. A segment of the first pipe has a main pipe, and two ends of a first alternative pipe are respectively connected to two ends of the main pipe. The suction pump is disposed in the first alternative pipe. The controller is coupled to the pressure sensing module and the suction pump. When the controller performs a self-checking operation, the main pipe is closed, the first alternative pipe is opened, and the controller starts the suction pump to perform forward suction. The controller measures a first air pressure through the first pipe and measures a second air pressure through the second pipe by the pressure sensing module. The controller calculates a reference wind speed value according to the first air pressure and the second air pressure.

In an embodiment of the invention, in the forward suction, the suction pump sucks in an outside air from the first opening, a part of the first pipe, and the first alternative pipe.

In an embodiment of the invention, the pressure sensing module includes a pressure sensor, a first hollow cavity, and a second hollow cavity. The first hollow cavity is connected to the first pipe, and the second hollow cavity is connected to the second pipe. The pressure sensor is disposed between the first hollow cavity and the second hollow cavity to isolate the first hollow cavity and the second hollow cavity.

In an embodiment of the invention, when the controller performs a normality check operation, the main pipe is opened, the first alternative pipe is closed, and the controller measures another first air pressure through the first pipe and measures another second air pressure through the second pipe by the pressure sensing module. The controller calculates a wind speed value according to the another first air pressure and the another second air pressure.

In an embodiment of the invention, the pipe body further includes a third opening, the third opening is connected to the first alternative pipe through a second alternative pipe. When the controller determines that the reference wind speed value or the wind speed value is lower than a first predetermined wind speed value or higher than a second predetermined wind speed value. The controller performs a pipe clearing operation, the main pipe is closed, the first alternative pipe and the second alternative pipe are opened. The controller starts the suction pump to perform reverse suction.

In an embodiment of the invention, in the reverse suction, the suction pump sucks in another outside air from the third opening and the second alternative pipe, and discharges the another outside air from the first alternative pipe, a part of the first pipe, and the first opening.

In an embodiment of the invention, the wind speed detection system further includes a first solenoid valve. The first solenoid valve is disposed in the main pipe, and coupled to the controller. When the controller performs the self-checking operation or the pipe clearing operation, the controller operates the first solenoid valve to close the main pipe.

In an embodiment of the invention, the wind speed detection system further includes a second solenoid valve. The second solenoid valve is disposed in the second alternative pipe and coupled to the controller. When the controller performs the self-checking operation or the normality check operation, the controller operates the second solenoid valve to close the second alternative pipe.

In an embodiment of the invention, when the controller performs the normality check operation, the controller closes the suction pump, and the first alternative pipe is closed by the suction pump.

In an embodiment of the invention, the wind speed detection system is disposed on a wing or a nose of the unmanned aerial vehicle, and the first opening is oriented toward a flight direction of the unmanned aerial vehicle.

To achieve one, part, or all of the above objectives or other objectives, an embodiment of the disclosure provides a wind speed detection method adapted for a wind speed detection system of an unmanned aerial vehicle. The wind speed detection system includes a pipe body. The pipe body has a first opening, a second opening, a pressure sensing module and a suction pump. The pressure sensing module is connected to the first opening through a first pipe and is connected to the second opening through a second pipe. A segment of the first pipe has a main pipe, and two ends of a first alternative pipe are respectively connected to two ends of the main pipe. The suction pump is disposed in the first alternative pipe. The wind speed detection method includes the following steps. When the wind speed detection system performs a self-checking operation, the main pipe is closed, and the first alternative pipe is opened. The suction pump is started to perform forward suction. The pressure sensing module measures a first air pressure through the first pipe, and measures a second air pressure through the second pipe. A reference wind speed value is calculated according to the first air pressure and the second air pressure.

In an embodiment of the invention, the step of starting the suction pump to perform the forward suction includes sucking in an outside air from the first opening, a part of the first pipe, and the first alternative pipe by the suction pump.

In an embodiment of the invention, the pressure sensing module includes a pressure sensor, a first hollow cavity, and a second hollow cavity. The first hollow cavity is connected to the first pipe. The second hollow cavity is connected to the second pipe. The pressure sensor is disposed between the first hollow cavity and the second hollow cavity to isolate the first hollow cavity and the second hollow cavity.

In an embodiment of the invention, the wind speed detection method further includes when the wind speed detection system performs a normality check operation, opening the main pipe, and closing the first alternative pipe; measuring another first air pressure through the first pipe and measuring another second air pressure through the second pipe by the pressure sensing module; and calculating a wind speed value according to the another first air pressure and the another second air pressure.

In an embodiment of the invention, the pipe body further includes a third opening, and the third opening is connected to the first alternative pipe through a second alternative pipe. The wind speed detection method further includes when the reference wind speed value or the wind speed value is lower than a first predetermined wind speed value or higher than a second predetermined wind speed value, performing a pipe clearing operation to close the main pipe and open the first alternative pipe and the second alternative pipe; and starting the suction pump to perform reverse suction.

In an embodiment of the invention, the step of starting the suction pump to perform the reverse suction includes sucking in another outside air from the third opening and the second alternative pipe, and discharging the another outside air from the first alternative pipe, a part of the first pipe, and the first opening by the suction pump.

In an embodiment of the invention, when performing the self-checking operation or the pipe clearing operation, the main pipe is closed by a first solenoid valve.

In an embodiment of the invention, when performing the self-checking operation or the normality check operation, the second alternative pipe is closed by a second solenoid valve.

In an embodiment of the invention, when performing the normality check operation, the suction pump is closed, and the first alternative pipe is closed by the suction pump.

In an embodiment of the invention, the wind speed detection system is disposed on a wing or a nose of the unmanned aerial vehicle, and the first opening is oriented toward a flight direction of the unmanned aerial vehicle.

Based on the above, the wind speed detection system and the wind speed detection method adapted for an unmanned aerial vehicle according to the embodiments of the disclosure may perform a self-checking operation by utilizing the alternative pipes and the suction pump provided in the pipe body, so that the wind speed detection system may automatically determine whether the wind speed detection system is normal or whether the pipe is blocked.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5 is a schematic view of a situation in which a wind speed detection system according to an embodiment of the disclosure performs a normality check operation.

FIG. 6 is a flowchart of a normality check operation according to an embodiment of the disclosure.

DESCRIPTION OF THE EMBODIMENTS

Figure 1:
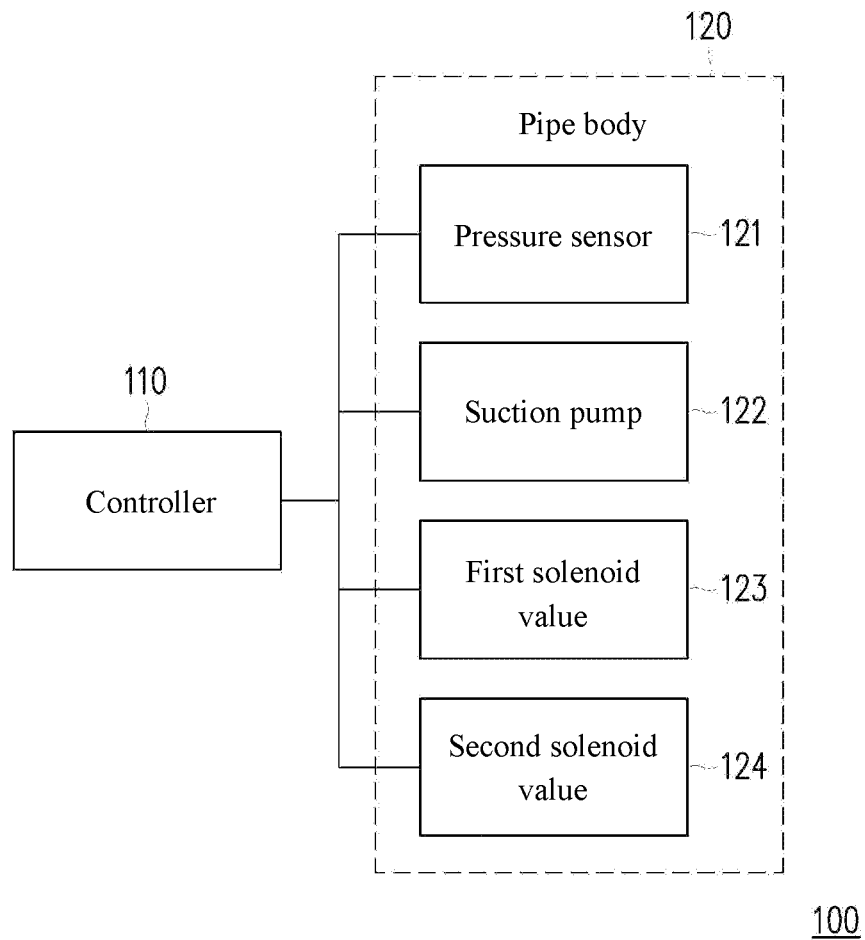
FIG. 1 is a schematic circuit diagram of a wind speed detection system according to an embodiment of the disclosure.

The foregoing and other technical contents, features, and effects of the disclosure will be clearly presented in the following detailed description of exemplary embodiments with reference to the drawings. The directional terms, such as "up", "down", "left", "right", "front", or "back", mentioned in the following embodiments only refer to the orientations in the accompanying drawings. Therefore, the directional terms used herein are intended to illustrate rather than limit the disclosure.

In order to make the content of the disclosure more comprehensible, the following embodiments are specifically provided as examples in which the disclosure may be implemented. In addition, wherever possible, elements/components/steps labeled with the same reference numerals in the drawings and embodiments represent the same or similar components.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

FIG. 1 is a schematic circuit diagram of a wind speed detection system according to an embodiment of the disclosure. Referring to FIG. 1, a wind speed detection system 100 includes a controller 110 and a pipe body 120. The pipe body 120 comprises a pressure sensor 121, a suction pump 122, a first solenoid valve 123, and a second solenoid valve 124. The pressure sensor 121, the suction pump 122, the first solenoid valve 123, and the second solenoid valve 124 are disposed in the pipe body 120. The controller 110 is coupled (electrically connected) to the pressure sensor 121, the suction pump 122, the first solenoid valve 123, and the second solenoid valve 124. In this embodiment, the pipe body 120 may include a wind speed measurement pipe structure having multiple pipes, and the pipe body 120 may be an improved Pitot tube device provided in the disclosure, for example. In this embodiment, the controller 110 may automatically determine whether the wind speed detection system 100 is normal or whether the pipe is blocked by operating the suction pump 122, the first solenoid valve 123, and the second solenoid valve 124 disposed in the multiple pipes of the pipe body 120 and utilizing the pressure sensor 121.

In this embodiment, the wind speed detection system 100 is adapted for being installed in an unmanned aerial vehicle and is configured to provide a real-time wind speed detection function. In this embodiment, the controller 110 may be a control core circuit of the unmanned aerial vehicle, or an additional control chip for providing a wind speed detection result to the control core circuit of the unmanned aerial vehicle. Accordingly, the controller 110 or the control core circuit of the unmanned aerial vehicle may perform relevant operations of flight control or flight determination according to the wind speed detection result, but the disclosure is not limited thereto. In this embodiment, the controller 110 may include a device having computing functions, such as a central processing unit (CPU) or another programmable general-purpose or specific-purpose microprocessor, digital signal processor (DSP), programmable controller, application specific integrated circuit (ASIC), programmable logic device (PLD), another similar processing device, or a combination of the above devices. The computing functions may refer to, for example, relevant calculations of air pressure values and wind speed values as described in the embodiments of the disclosure.

In this embodiment, the pressure sensor 121 is an air pressure measuring device. The pressure sensor 121 may be disposed in one or more hollow cavities and may measure an air pressure value of the hollow cavities. The controller 110 may convert the air pressure value to a corresponding wind speed value. In this embodiment, the suction pump 122 is disposed in a pipe and has a forward suction function and a reverse suction function. In addition, the suction pump 122 further includes a valve mechanism. When the suction pump 122 is not operating, the valve mechanism of the suction pump 122 may be closed so that the pipe is closed. In this embodiment, the first solenoid valve 123 and the second solenoid valve 124 may be disposed in different pipes and each may have a valve mechanism, so that the controller 110 may operate the first solenoid valve 123 and the second solenoid valve 124 to open or close the respective pipes in which the first solenoid valve 123 and the second solenoid valve 124 are disposed.

Figure 2A:
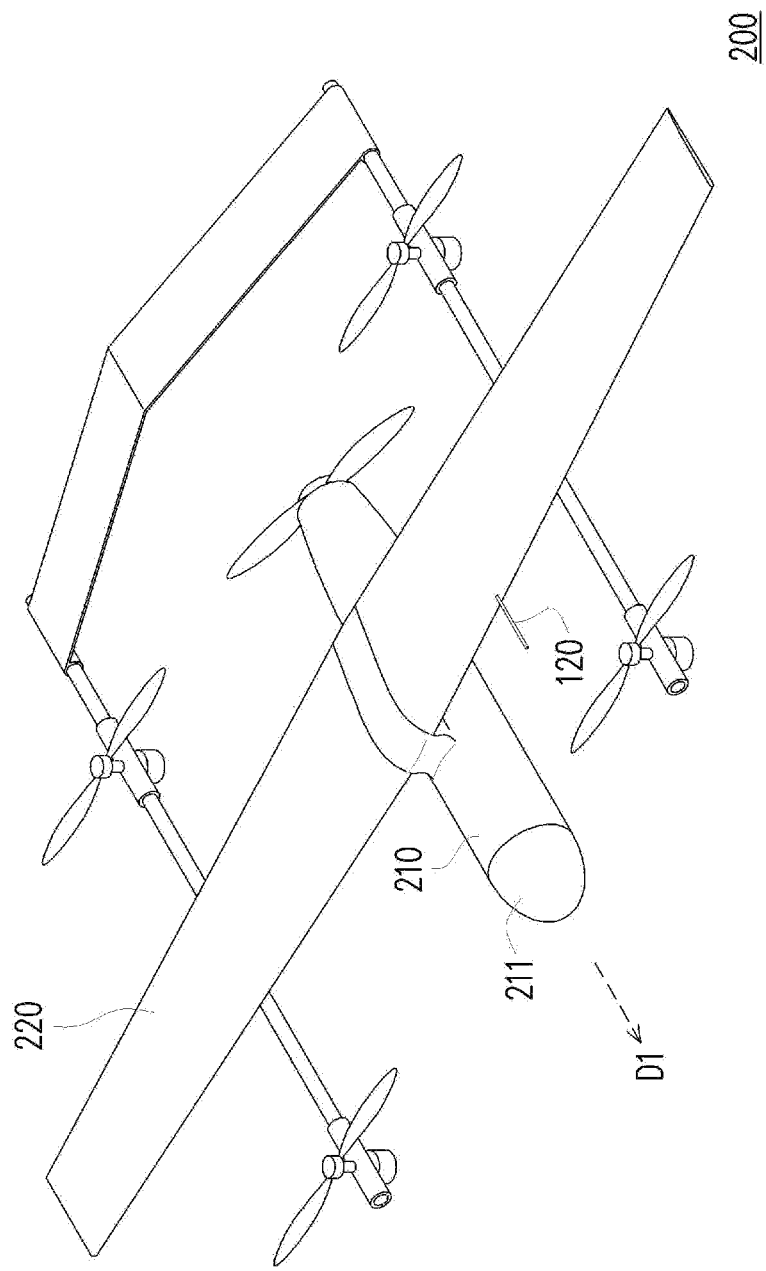
FIG. 2A is a schematic view of an unmanned aerial vehicle according to an embodiment of the disclosure.

FIG. 2A is a schematic view of an unmanned aerial vehicle according to an embodiment of the disclosure. Referring to FIG. 1 and FIG. 2A, an unmanned aerial vehicle 200 has a body 210 and a wing 220, and the front end of the body 210 is a nose 211. The wing 220 is disposed on the body 210. In this embodiment, the pipe body 120 may be disposed on the wing 220 (at a windward position) of the unmanned aerial vehicle 200, so that during the flight of the unmanned aerial vehicle 200, the wind speed detection system 100 may effectively detect a wind speed of the unmanned aerial vehicle 200, and the core control circuit of the unmanned aerial vehicle 200 may accurately determine a current flight speed according to the real-time wind speed detection result.

Figure 2B:
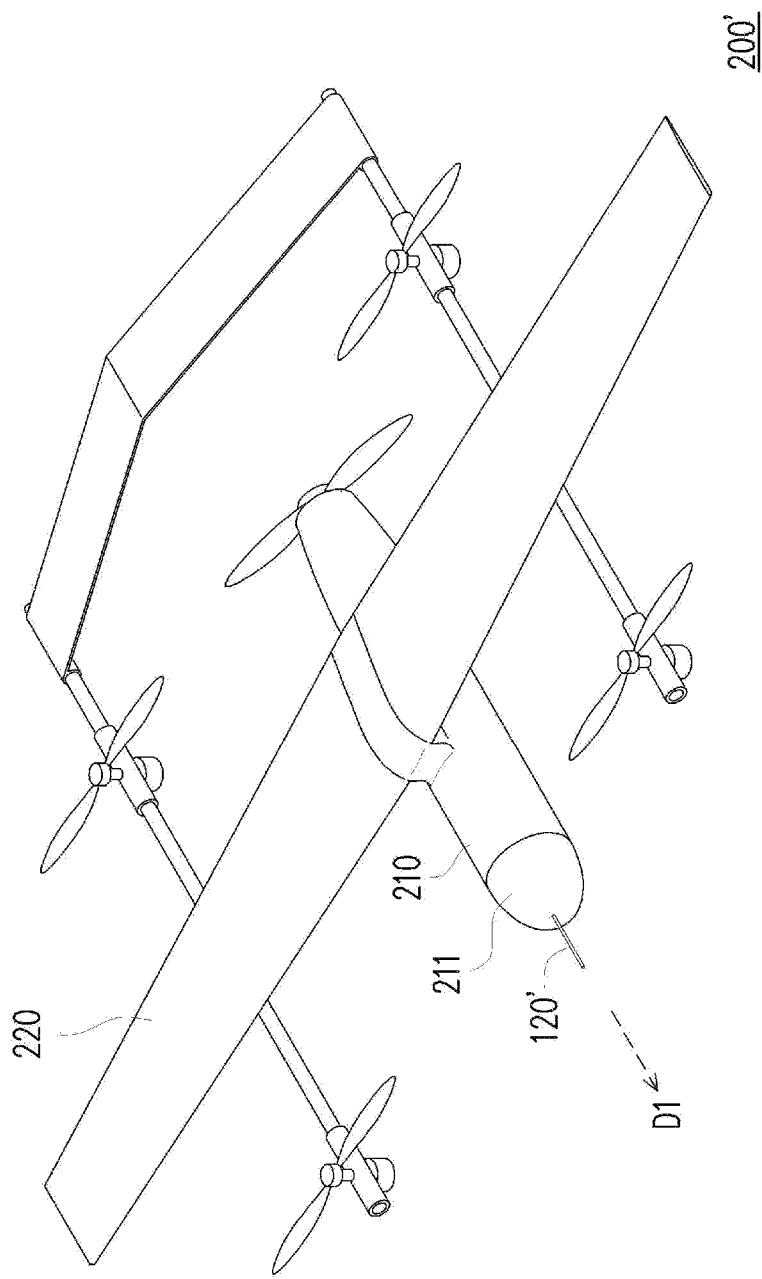
FIG. 2B is a schematic view of an unmanned aerial vehicle according to another embodiment of the disclosure.

FIG. 2B is a schematic view of an unmanned aerial vehicle according to another embodiment of the disclosure. Referring to FIG. 1 and FIG. 2B, an unmanned aerial vehicle 200' has a body 210 and a wing 220, and the front end of the body 210 is a nose 211. The wing 220 is disposed on the body 210. In this embodiment, a pipe body 120' may be disposed on the nose 211 (at a windward position) of the unmanned aerial vehicle 200', so that during the flight of the unmanned aerial vehicle 200', the wind speed detection system 100 may effectively detect a wind speed of the unmanned aerial vehicle 200', and the core control circuit of the unmanned aerial vehicle 200' may accurately determine a current flight speed according to the real-time wind speed detection result.

Figure 3:
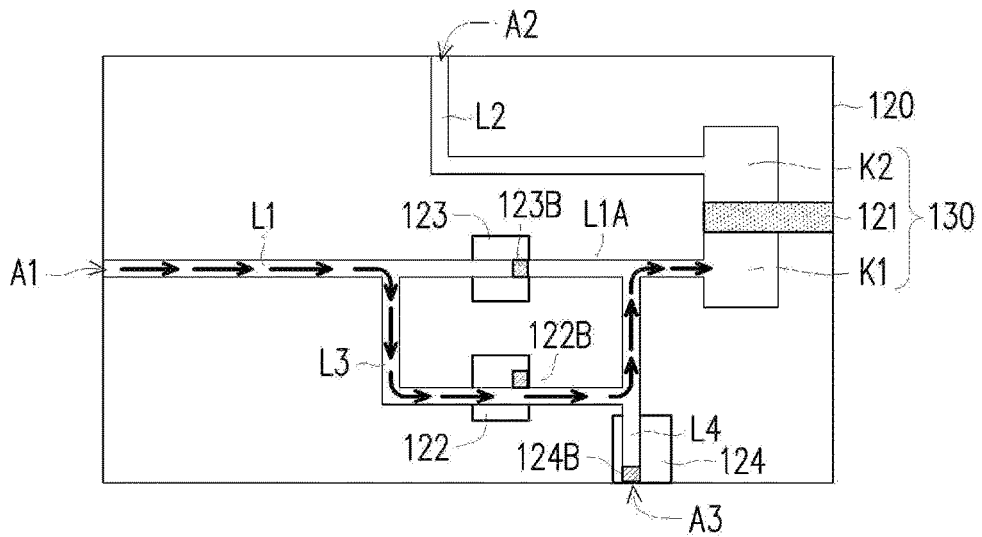
FIG. 3 is a schematic view of a situation in which a wind speed detection system according to an embodiment of the disclosure performs a self-checking operation.
Figure 4:
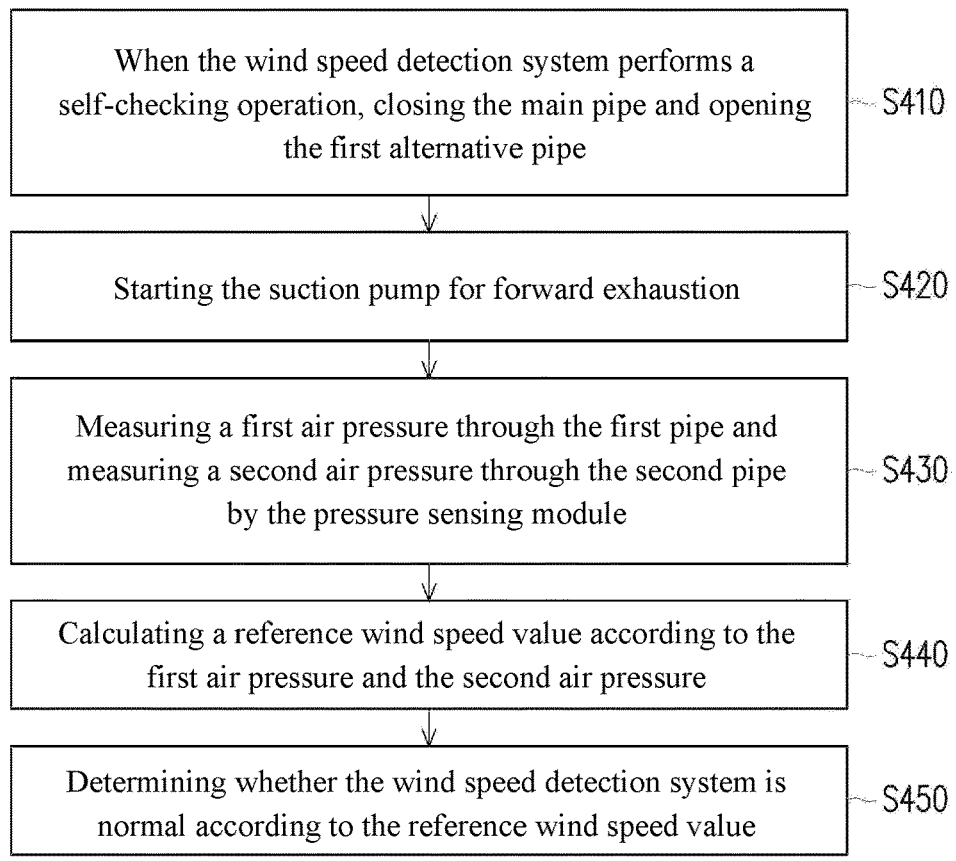
FIG. 4 is a flowchart of a wind speed detection method according to an embodiment of the disclosure.

FIG. 3 is a schematic view of a situation in which a wind speed detection system according to an embodiment of the disclosure performs a self-checking operation. FIG. 4 is a flowchart of a wind speed detection method according to an embodiment of the disclosure. Referring to FIG. 3, the pipe body 120 has a first opening A1, a second opening A2, a third opening A3, a first pipe L1, a second pipe L2, and a pressure sensing module 130. The pressure sensing module 130 includes a pressure sensor 121, a first hollow cavity K1, and a second hollow cavity K2. The pressure sensor 121 is disposed between the first hollow cavity K1 and the second hollow cavity K2 to isolate the first hollow cavity K1 and the second hollow cavity K2. The pressure sensor 121 may sense an air pressure of the first hollow cavity K1 and the second hollow cavity K2 respectively. In this embodiment, the first hollow cavity K1 of the pressure sensing module 130 is connected to the first opening A1 through the first pipe L1, and the second hollow cavity K2 is connected to the second opening A2 through the second pipe L2. A segment of the first pipe L1 is a main pipe L1A, and two ends a first alternative pipe L3 are respectively connected to two ends of the main pipe L1A. The segment is located in a part of the first pipe L1 from the first opening A1 to the first hollow cavity K1. In this embodiment, the third opening A3 is connected to the first alternative pipe L3 through a second alternative pipe L4.

In this embodiment, the suction pump 122 is disposed in the first alternative pipe L3. The first solenoid valve 123 is disposed in the main pipe L1A. The second solenoid valve 124 is disposed in the second alternative pipe L4. In some embodiments of the disclosure, the first opening A1, the second opening A2, and the third opening A3 may be respectively located at positions of different orientations of the pipe body 120, but the disclosure is not limited thereto. For example, the first opening A1 may be located at a position of the pipe body 120 toward a flight direction D1 (shown in FIG. 2A and FIG. 2B) of the unmanned aerial vehicle. The second opening A2 and the third opening A3 may be respectively located at different positions perpendicular to the flight direction D1 of the unmanned aerial vehicle.

Referring to FIG. 1, FIG. 3, and FIG. 4, the wind speed detection system 100 of this embodiment may perform steps S410 to S450 to perform a self-checking operation. In step S410, when the wind speed detection system 100 performs a self-checking operation, the main pipe L1A is closed, and the first alternative pipe L3 is opened. In this embodiment, the controller 110 may control the first solenoid valve 123 and the second solenoid valve 124 to close, so that a valve 123B of the first solenoid valve 123 closes the main pipe L1A, and a valve 124B of the second solenoid valve 124 closes the second alternative pipe L4. The controller 110 may control a valve 122B of the suction pump 122 to open, so that the first alternative pipe L3 is opened. In step S420, the controller 110 of the wind speed detection system 100 may start the suction pump 122 to perform forward suction. As shown in FIG. 3, in the forward suction, the suction pump 122 sucks in an outside air from the first opening A1 to pass through a part of the first pipe L1 (a part of the pipe between the first opening A1 and the main pipe L1A) and the first alternative pipe L3 to the first hollow cavity K1.

In step S430, the controller 110 of the wind speed detection system 100 may measure a first air pressure (Pt) through the first pipe L1 and measure a second air pressure (Ps) through the second pipe L2 by the pressure sensing module 130. In step S440, the controller 110 of the wind speed detection system 100 may calculate a reference wind speed value according to the first air pressure (Pt) and the second air pressure (Ps). In this embodiment, the controller 110 may perform, for example, the calculation of Formula (1) to obtain a reference wind speed value (V), wherein "r" is an air density.

$$V^2 = \frac{2(Pt - Ps)}{r} \quad \text{Formula (1)}$$

In step S450, the controller 110 of the wind speed detection system 100 may determine whether the wind speed detection system 100 is normal according to the reference wind speed value (V). In this embodiment, the self-checking operation may be performed before the unmanned aerial vehicle takes off. Through the self-checking operation, the wind speed detection system 100 may effectively determine whether the wind speed detection system is normal or whether the first pipe L1 and/or the second pipe L2 is blocked. In addition, when the controller 110 of the wind speed detection system 100 determines that the wind speed detection system 100 is abnormal, the controller 110 may output a warning signal to a control device (not shown) used by the user to prompt the user to perform fault elimination or keep the unmanned aerial vehicle from taking off temporarily.

For example, since the degree of suction of the suction pump 122 is a setting known to the controller 110, the controller 110 may determine whether the wind speed detection system 100 is normal by determining whether the reference wind speed value matches an expected wind speed value. Herein, "the wind speed detection system 100 is normal" as described in the embodiments of the disclosure may mean, for example, that the suction pump 122 may operate normally, the solenoid valves may operate normally, the pipes are not blocked or damaged, and/or the unmanned aerial vehicle is flying normally, and the disclosure is not limited thereto. Also, "the wind speed detection system 100 is abnormal" may mean, for example, that the suction pump 122 does not operate normally, the solenoid valves do not operate normally, the pipes are blocked or damaged, and/or the unmanned aerial vehicle is flying abnormally, and the disclosure is not limited thereto. Therefore, when the reference wind speed value is within a predetermined wind speed range (e.g., the reference wind speed value is higher than or equal to a first predetermined wind speed value and lower than or equal to a second predetermined wind speed value), it means that the wind speed detection system 100 is normal. When the reference wind speed value is not within the predetermined wind speed range (e.g., the reference wind speed value is lower than the first predetermined wind speed value or higher than the second predetermined wind speed value), it means that the wind speed detection system 100 is abnormal. Alternatively, the controller 110 may determine whether the reference wind speed value is lower than the first predetermined wind speed value to determine that the first pipe L1 is blocked. Alternatively, the controller 110 may determine whether the reference wind speed value is higher than the second predetermined wind speed value to determine that the second pipe L2 is blocked.

FIG. 5 is a schematic view of a situation in which a wind speed detection system according to an embodiment of the disclosure performs a normality check operation. FIG. 6 is a flowchart of a normality check operation according to an embodiment of the disclosure. The pipe body 120 of FIG. 5 has the same pipes and component configurations as the pipe body 120 of FIG. 3, and the same descriptions shall not be repeated herein. Referring to FIG. 1, FIG. 5, and FIG. 6, the wind speed detection system 100 of this embodiment may perform steps S610 to S630 below to perform a normality check operation. In step S610, when the wind speed detection system 100 performs a normality check operation, the main pipe L1A is opened, and the first alternative pipe L3 is closed. In this embodiment, the controller 110 may control the valve 122B of the suction pump 122 to close, so that the first alternative pipe L3 is closed. The controller 110 may control the valve 124B of the second solenoid valve 124 to close, so that the second alternative pipe L4 is closed. The controller 110 may control the valve 123B of the first solenoid valve 123 to open, so that the main pipe L1A is opened.

In step S620, the controller 110 of the wind speed detection system 100 may measure another first air pressure (Pt') through the first pipe L1 and measure another second air pressure (Ps') through the second pipe L2 by the pressure sensing module 130. In step S630, the controller 110 of the wind speed detection system 100 may calculate a wind speed value (V') according to the another first air pressure (Pt') and the another second air pressure (Ps'). In this embodiment, the controller 110 may perform, for example, a calculation similar to Formula (1) above to obtain the wind speed value. Moreover, the above normality check operation may be performed before the unmanned aerial vehicle takes off or during the flight of the unmanned aerial vehicle, so that the unmanned aerial vehicle may effectively determine a current wind speed value and may convert to a correct flight speed. In addition, in some embodiments of the disclosure, according to the wind speed value, the controller 110 of the wind speed detection system 100 may further determine whether the wind speed detection system 100 is normal or whether the unmanned aerial vehicle is normally controlled during flight. When the wind speed value is within a predetermined wind speed range (e.g., the wind speed value is higher than or equal to a first predetermined wind speed value and lower than or equal to a second predetermined wind speed value), it means that the wind speed detection system 100 is normal. When the wind speed value is not within the predetermined wind speed range (e.g., the wind speed value is lower than the first predetermined wind speed value or higher than the second predetermined wind speed value), it means that the wind speed detection system 100 is abnormal. For example, the controller 110 may determine whether the wind speed value is lower than the first predetermined wind speed value to determine that the first pipe L1 is blocked or the unmanned aerial vehicle is improperly operated (e.g., the flight speed is too low). Alternatively, the controller 110 may determine whether the wind speed value is higher than the second predetermined wind speed value to determine that the second pipe L2 is blocked or the unmanned aerial vehicle is improperly operated (e.g., the flight speed is too high).

Figure 7:
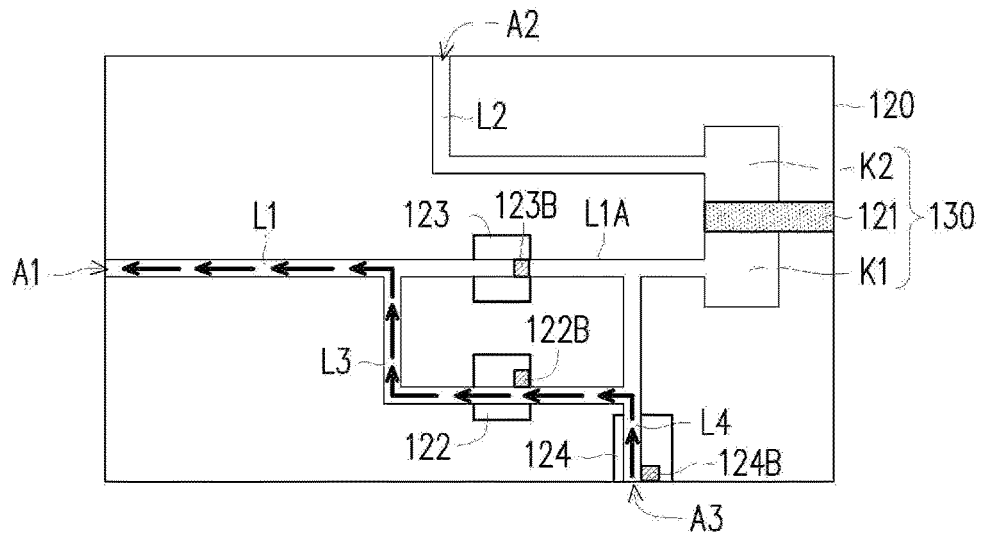
FIG. 7 is a schematic view of a situation in which a wind speed detection system according to an embodiment of the disclosure performs a pipe clearing operation.
Figure 8:
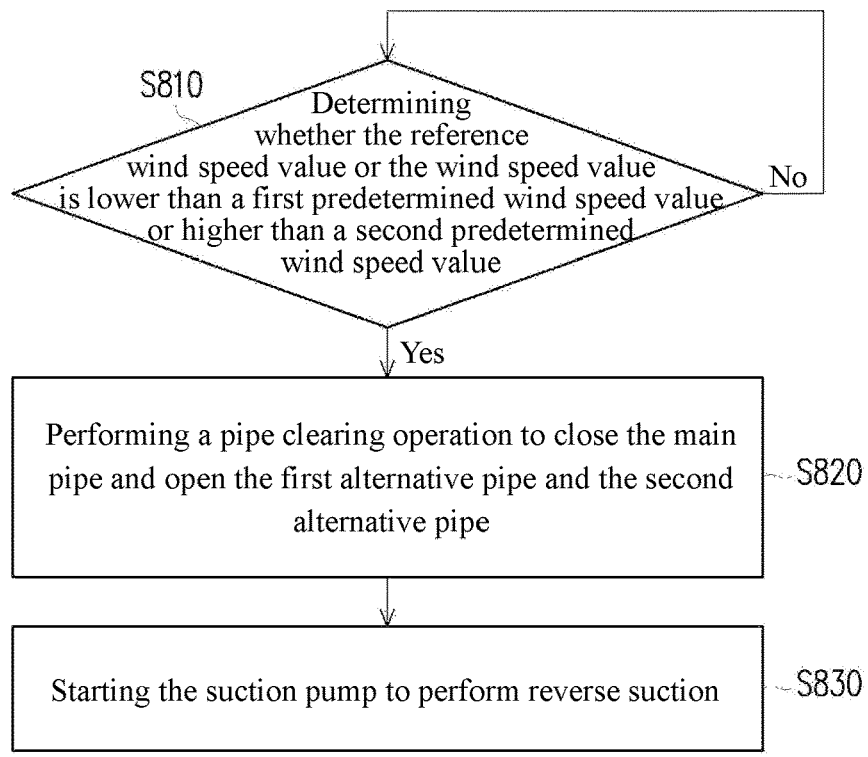
FIG. 8 is a flowchart of a pipe clearing operation according to an embodiment of the disclosure.

FIG. 7 is a schematic view of a situation in which a wind speed detection system according to an embodiment of the disclosure performs a pipe clearing operation. FIG. 8 is a flowchart of a pipe clearing operation according to an embodiment of the disclosure. The pipe body 120 of FIG. 7 has the same pipes and component configurations as the pipe body 120 of FIG. 3, and the same descriptions shall not be repeated herein. Referring to FIG. 1, FIG. 7, and FIG. 8, the wind speed detection system 100 of this embodiment may perform steps S810 to S830 to perform a pipe clearing operation. Moreover, the pipe clearing operation of this embodiment may be performed after step S450 in FIG. 4 or step S630 in FIG. 6, but the disclosure is not limited thereto. In step S810, the controller 110 of the wind speed detection system 100 may determine whether the reference wind speed value or the wind speed value is higher than a first predetermined wind speed value or lower than a second predetermined wind speed value. If not, the controller 110 may perform step S810 again after a predetermined time interval elapses to recursively monitor the wind speed. If yes, the controller 110 performs step S820. In step S820, the controller 110 of the wind speed detection system 100 may perform a pipe clearing operation to close the main pipe L1A and open the first alternative pipe L3 and the second alternative pipe L4. In this embodiment, the controller 110 may control the valve 122B of the suction pump 122 to open, so that the first alternative pipe L3 is opened. The controller 110 may control the valve 123B of the first solenoid valve 123 to close, so that the main pipe L1A is closed. The controller 110 may control the valve 124B of the second solenoid valve 124 to open, so that the second alternative pipe L4 is opened.

In step S830, the controller 110 of the wind speed detection system 100 may start the suction pump 122 to perform reverse suction. As shown in FIG. 8, in the reverse suction, the suction pump 122 sucks in another outside air from the third opening A3 through the second alternative pipe L4, passes the another outside air through the first alternative pipe L3 and a part of the first pipe L1, and finally discharges the another outside air from the first opening A1. In this embodiment, a pressure value provided by the reverse suction of the suction pump 122 is greater than the air pressure value, so that an obstruction (e.g., dew, dust, etc.) in the pipe may be discharged. Therefore, in this embodiment, if an obstruction is present in the part of the first pipe L1 (a part of the pipe between the first opening A1 and the main pipe L1A), the suction pump 122 may automatically perform a suction operation for clearing the pipe.

In summary of the above, the wind speed detection system and the wind speed detection method adapted for an unmanned aerial vehicle according to the disclosure may perform a self-checking operation, a normality check operation, and a pipe clearing operation by utilizing a specific pipe design along with the operations of the suction pump and the solenoid valves, to thereby realize an automatic checking function, an automatic wind speed detection function, and an automatic pipe clearing function of the system.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particular exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A wind speed detection system adapted for an unmanned aerial vehicle, wherein the wind speed detection system comprises:
   a pipe body, having a first opening, a second opening, a pressure sensing module and a suction pump,
   the pressure sensing module, connected to the first opening through a first pipe and connected to the second opening through a second pipe, wherein a segment of the first pipe has a main pipe, and two ends of a first alternative pipe are respectively connected to two ends of the main pipe;
   the suction pump, disposed in the first alternative pipe; and
   a controller, coupled to the pressure sensing module and the suction pump,
   wherein when the controller performs a self-checking operation, the main pipe is closed, the first alternative pipe is opened, and the controller starts the suction pump to perform forward suction,
   wherein the controller measures a first air pressure through the first pipe and measures a second air pressure through the second pipe by the pressure sensing module,
   wherein the controller calculates a reference wind speed value according to the first air pressure and the second air pressure.

2. The wind speed detection system according to claim 1, wherein in the forward suction, the suction pump sucks in an outside air from the first opening, a part of the first pipe, and the first alternative pipe.

3. The wind speed detection system according to claim 1, wherein the pressure sensing module comprises a pressure sensor, a first hollow cavity, and a second hollow cavity, wherein the first hollow cavity is connected to the first pipe, and the second hollow cavity is connected to the second pipe, wherein the pressure sensor is disposed between the first hollow cavity and the second hollow cavity to isolate the first hollow cavity and the second hollow cavity.

4. The wind speed detection system according to claim 1, wherein when the controller performs a normality check operation, the main pipe is opened, the first alternative pipe is closed, and the controller measures another first air pressure through the first pipe and measures another second air pressure through the second pipe by the pressure sensing module,
   wherein the controller calculates a wind speed value according to the another first air pressure and the another second air pressure.

5. The wind speed detection system according to claim 4, wherein the pipe body further comprises a third opening, the third opening is connected to the first alternative pipe through a second alternative pipe,
   wherein when the controller determines that the reference wind speed value or the wind speed value is lower than a first predetermined wind speed value or higher than a second predetermined wind speed value, the controller performs a pipe clearing operation, the main pipe is closed, the first alternative pipe and the second alternative pipe are opened, and the controller starts the suction pump to perform reverse suction.

6. The wind speed detection system according to claim 5, wherein in the reverse suction, the suction pump sucks in another outside air from the third opening and the second alternative pipe, and discharges the another outside air from the first alternative pipe, a part of the first pipe, and the first opening.

7. The wind speed detection system according to claim 5, further comprising:
   a first solenoid valve, disposed in the main pipe, and coupled to the controller,
   wherein when the controller performs the self-checking operation or the pipe clearing operation, the controller operates the first solenoid valve to close the main pipe.

8. The wind speed detection system according to claim 5, further comprising:
   a second solenoid valve disposed in the second alternative pipe and coupled to the controller,
   wherein when the controller performs the self-checking operation or the normality check operation, the controller operates the second solenoid valve to close the second alternative pipe.

9. The wind speed detection system according to claim 4, wherein when the controller performs the normality check operation, the controller closes the suction pump, and the first alternative pipe is closed by the suction pump.

10. The wind speed detection system according to claim 1, wherein the wind speed detection system is disposed on a wing or a nose of the unmanned aerial vehicle, and the first opening is oriented toward a flight direction of the unmanned aerial vehicle.

11. A wind speed detection method adapted for a wind speed detection system of an unmanned aerial vehicle, wherein the wind speed detection system comprises a pipe body, wherein the pipe body has a first opening, a second opening, a pressure sensing module and a suction pump, wherein the pressure sensing module is connected to the first opening through a first pipe and is connected to the second opening through a second pipe, wherein a segment of the first pipe has a main pipe, and two ends of a first alternative pipe are respectively connected to two ends of the main pipe, wherein the suction pump is disposed in the first alternative pipe, wherein the wind speed detection method comprises:
   when the wind speed detection system performs a self-checking operation, closing the main pipe and opening the first alternative pipe;
   starting the suction pump to perform forward suction;
   measuring a first air pressure through the first pipe and measuring a second air pressure through the second pipe by the pressure sensing module; and
   calculating a reference wind speed value according to the first air pressure and the second air pressure.

12. The wind speed detection method according to claim 11, wherein the step of starting the suction pump to perform the forward suction comprises:
   sucking in an outside air from the first opening, a part of the first pipe, and the first alternative pipe by the suction pump.

13. The wind speed detection method according to claim 11, wherein the pressure sensing module comprises a pressure sensor, a first hollow cavity, and a second hollow cavity, wherein the first hollow cavity is connected to the first pipe, and the second hollow cavity is connected to the second pipe, wherein the pressure sensor is disposed between the first hollow cavity and the second hollow cavity to isolate the first hollow cavity and the second hollow cavity.

14. The wind speed detection method according to claim 11, further comprising:
   when the wind speed detection system performs a normality check operation, opening the main pipe, and closing the first alternative pipe;

measuring another first air pressure through the first pipe and measuring another second air pressure through the second pipe by the pressure sensing module; and calculating a wind speed value according to the another first air pressure and the another second air pressure.

15. The wind speed detection method according to claim 14, wherein the pipe body further comprises a third opening, and the third opening is connected to the first alternative pipe through a second alternative pipe, the wind speed detection method further comprising:

when the reference wind speed value or the wind speed value is lower than a first predetermined wind speed value or higher than a second predetermined wind speed value, performing a pipe clearing operation to close the main pipe and open the first alternative pipe and the second alternative pipe; and starting the suction pump to perform reverse suction.

16. The wind speed detection method according to claim 15, wherein the step of starting the suction pump to perform the reverse suction comprises:

sucking in another outside air from the third opening and the second alternative pipe, and discharging the another outside air from the first alternative pipe, a part of the first pipe, and the first opening by the suction pump.

17. The wind speed detection method according to claim 15, wherein when performing the self-checking operation or the pipe clearing operation, the main pipe is closed by a first solenoid valve.

18. The wind speed detection method according to claim 15, wherein when performing the self-checking operation or the normality check operation, the second alternative pipe is closed by a second solenoid valve.

19. The wind speed detection method according to claim 14, wherein when performing the normality check operation, the suction pump is closed, and the first alternative pipe is closed by the suction pump.

20. The wind speed detection method according to claim 11, wherein the wind speed detection system is disposed on a wing or a nose of the unmanned aerial vehicle, and the first opening is oriented toward a flight direction of the unmanned aerial vehicle.

* * * * *